Aug. 21, 1928.
J. M. BARR
1,681,914
DYNAMO ELECTRIC MACHINE STATOR
Filed Dec. 12, 1923
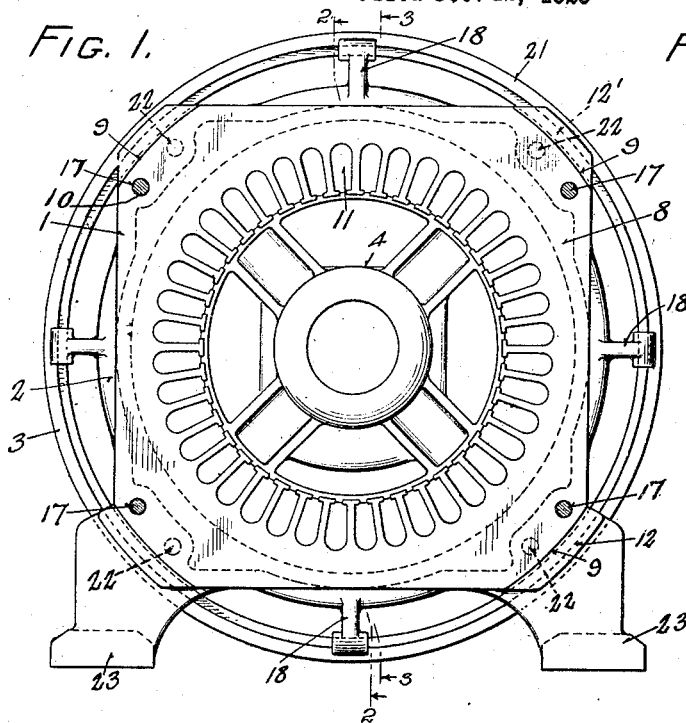
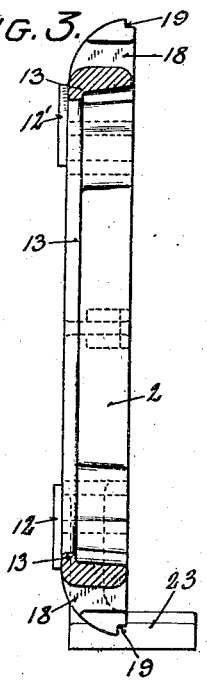
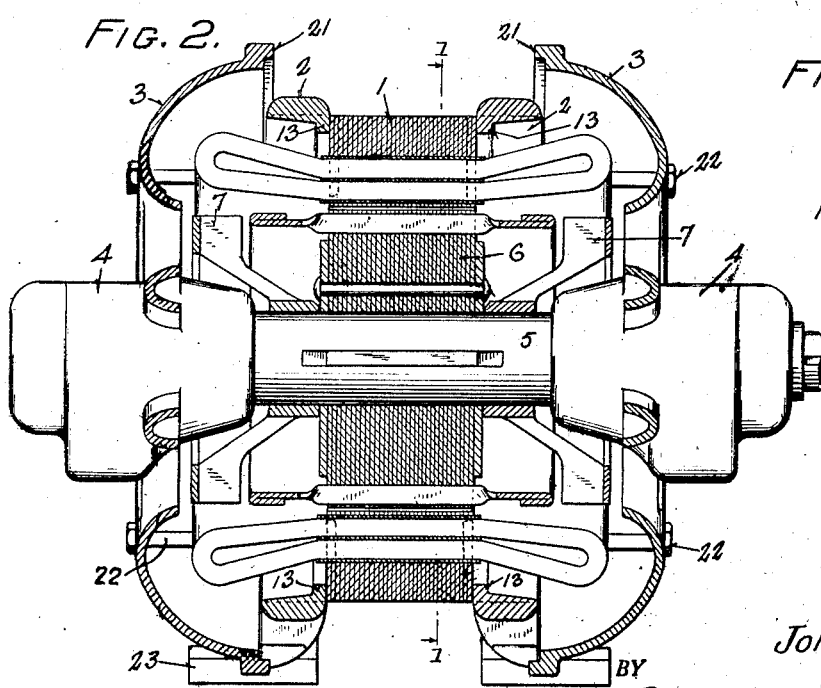
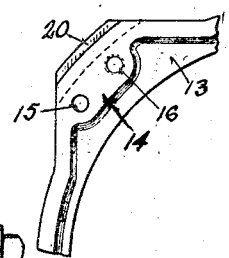
INVENTOR.
John M. Barr
BY
Edwin B. H. Tower, Jr.
ATTORNEY.

Patented Aug. 21, 1928.

1,681,914

UNITED STATES PATENT OFFICE.

JOHN M. BARR, OF MILWAUKEE, WISCONSIN, ASSIGNOR TO THE LOUIS ALLIS COMPANY, OF MILWAUKEE, WISCONSIN, A CORPORATION OF WISCONSIN.

DYNAMO-ELECTRIC-MACHINE STATOR.

Application filed December 12, 1923. Serial No. 680,159.

This invention relates to a dynamo electric machine stator.

The stator to which this invention applies is provided with separate end frames, a core arranged between these end frames and having a central opening for the rotor, and an end casing carried on each end frame and having a bearing for the rotor shaft.

The object of the invention is to facilitate ventilating the stator and cooling its core.

Another object is to provide an enlarged passage between each end frame and its casing for the discharge of heated air from the stator.

Another object is to provide a stator which is strong, sturdy and compact, and which may be readily and economically manufactured.

According to the invention, the stator has ventilating passages arranged between each end frame and the end casing carried thereby.

The stator set forth herein is a modification of the invention set forth and claimed in co-pending application, Serial No. 693,615, filed February 18, 1924.

The accompanying drawings illustrate a dynamo electric machine in which the stator is employed, and the views therein are as follows:

Fig. 1 is a vertical section of the stator on line 1—1 of Fig. 2.

Fig. 2 is a longitudinal section of the dynamo electric machine on line 2—2 of Fig. 1.

Fig. 3 is a section of the end frame on line 3—3 of Fig. 1.

Fig. 4 is a detailed view of a corner of the end frame.

The stator comprises, in general, a stator core 1, end frames 2 therefor, and end casings 3 supported by the end frames.

The end casings are provided with bearings 4 for the shaft 5 which carries rotor 6.

The shaft 5 is provided with fans 7.

The stator core 1 is square with rounded corners and may be made of laminations 8.

The laminations 8 may be stamped out of sheet metal. The laminations have rounded corners 9 which are arcs of a single circle. Simultaneously, holes 10 and winding slots 11 may be stamped to insure a common axis for the entire lamination.

The end frame 2 is square adjacent the stator core 1, and is provided with flanges 12 and 12' at the corners to fit the corners of the end laminations of the stator core and to prevent radial displacement of the stator core relative to frame 2.

The end frame 2 is provided with a flange 13 adapted to receive the face of the stator core and to prevent bulging of the laminations due to internal pressure within the stator core.

The end frame 2 is also provided with lugs 14 at the corners. These lugs are adapted to receive the face of the corners of the stator core. The lugs 14 are provided with holes 15 and threaded openings 16.

The flange 13 and lugs 14 adjacent the stator core 1 may have their faces roughened to increase the frictional contact between the face of the stator core and of the flange 13 and lugs 14. This roughened surface may be supplemented or substituted by water glass or other abrasive or adhesive substance to increase the frictional resistance between the faces of the stator core and the flange 13 and lugs 14.

In assembling the frames 2 and the stator core 1, an end frame 2 is placed face upward with rivets 17 passing thorugh holes 15. Laminations 8 are then assembled on the frame 2 by passing rivets 17 through holes 10. The other frame 2 is then placed over the laminations 8.

An expansible mandrel which has a flange to fit the end frames is placed inside the laminations. A slight pressure is applied to this assembly and the mandrel expanded to align the stator core and the frames. Great pressure is then applied to the assembly and the metal of the rivets 17 is turned while under pressure to secure the end frames 2 and the stator core 1 into a compact unit.

The end frames 2 have radially extending lugs 18 which are provided with flanges 19 on the opposite side of the frames from the stator core to receive the end casings 3 and prevent radial displacement thereof.

The frames 2 are provided with flanges 20 at the corners on the sides opposite from the stator core to receive the end casings 3 at the corners as well as at the lugs 18.

The flanges 12 and 12' may be shaped by a rotating tool into arcs of a single circle corresponding to arcs 9 of the laminations.

Likewise, flanges 19 and 20 may be shaped by a rotating tool to have an axis coincident with that of flanges 12 and 12'. The flanges 21 of end casings 3, fitting over the flanges 19 and 20, may also be shaped by a rotating tool. A common axis is thus insured for the several parts of the machine.

After the laminations and end frames have been assembled, the assembly may be mounted on a mandrel and the flanges 19 and 20 may be cut by a rotating tool to planes perpendicular to the axis of the assembly. Sufficient material is provided on the end frames 2 so that the flanges 19 and 20 may be machined to planes perpendicular to the axis of the assembly.

Slight irregularities in the thickness of the laminations or end frames, which might cause the ends of the assembly not to be parallel or at right angles to the axis of the assembly may be compensated by cutting the flanges 19 and 20 at right angles to the axis of the assembly.

Bolts 22 are passed through the end casings and screwed into holes 16 in the end frames to fasten the end casings thereon. There is substantially no strain on the frames 2, the bolts 22 and the rivets 17 being adjacent each other.

The frames 2 are provided with standards 23 for supporting the machine.

The end frames are shaped to have substantially continuous engagement with the stator core.

Each end casing extends beyond its end frame to provide large passages between the same for the discharge of air from the machine.

These large ventilating passages allow a larger volume of air to be passed through the stator with less pressure.

While one embodiment of the invention has been described, it is understood that the invention is not limited to the embodiment shown and described.

What I claim is:

1. A stator comprising a laminated core, end frames supporting said core, and casings carried by said end frames and formed to provide ventilating passages between the same and said end frames.

2. In combination, a stator core, an end frame therefor, an end casing, and means for mounting the end casing on said frame to provide ventilating passages between said frame and said casing.

3. In combination, a square stator core, end casings and end frames having square faces adjacent said core and having lugs to receive said end casings.

4. A stator comprising a laminated core, end frames supporting said core, end casings formed to provide ventilating passages between the same and said end frames, and lugs formed on said end frames and carrying said casings.

5. In combination, a stator core, an end frame therefor, lugs on said frame, flanges on said lugs, and an end casing arranged on said lugs.

6. In combination, a stator core, an end frame therefor, lugs on said frame away from said stator core, and an end casing mounted on said lugs.

7. A dynamo electric machine stator comprising a stator core, end frames for supporting the same, and end casings mounted on said frames, said frames having flanges extending radially inward to receive the face of the stator core, flanges to receive the edge of the stator core and lugs extending radially outward to receive the end casings.

8. A dynamo electric machine stator having a stator core, end supporting frames, and end casings, said end frames having flanges to receive the edge of the stator core and lugs extending away from said frames to receive said end casings.

9. A dynamo electric machine stator having a square stator core, and square end supporting frames therefor having flanges at the corners and having flanged lugs intermediate said corners to receive end casings.

10. A dynamo electric machine stator having a square stator core, square end supporting frames therefor and round end casings, said end frames having flanges shaped to receive the corners of the stator core and having flanges at the corners and flanged lugs intermediate said corners for receiving said end casings.

11. In combination, a square stator core, a square end frame, an end casing of different configuration from said end frame, a flange arranged at a corner between said end frame and end casing, and a lug arranged between said end casing and frame.

12. In combination, a square stator core, a square end frame, a round end casing, radially inwardly extending lugs at the corners of said frame, means passing through said lugs and stator core for securing said stator core and frame together, and means passing through said lugs and end casing for fastening said end casing upon said end frame.

13. A stator comprising a laminated core, end frames supporting said core, end casings formed to provide ventilating passages between the same and said end frames, and lugs arranged between said end casings and said end frames to hold the same from relative radial displacement.

In witness whereof I have hereunto subscribed my name.

JOHN M. BARR.